(12) United States Patent
Yukimasa et al.

(10) Patent No.: US 10,483,574 B2
(45) Date of Patent: Nov. 19, 2019

(54) FUEL CELL SYSTEM WITH MERGED GASES FOR LEAK DETECTION

(71) Applicant: Panasonic Intellectual Property Management Co., Ltd., Osaka (JP)

(72) Inventors: Akinori Yukimasa, Osaka (JP); Takehiko Ise, Osaka (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/484,380

(22) Filed: Apr. 11, 2017

(65) Prior Publication Data

US 2017/0309939 A1    Oct. 26, 2017

(30) Foreign Application Priority Data

Apr. 26, 2016    (JP) .................................. 2016-087934

(51) Int. Cl.
*H01M 8/04955*    (2016.01)
*H01M 8/04029*    (2016.01)
(Continued)

(52) U.S. Cl.
CPC ... *H01M 8/04955* (2013.01); *H01M 8/04029* (2013.01); *H01M 8/04097* (2013.01);
(Continued)

(58) Field of Classification Search
CPC ......... H01M 8/04955; H01M 8/04462; H01M 8/04097; H01M 8/0447; H01M 8/04791; H01M 8/04798; H01M 8/04805
See application file for complete search history.

(56) References Cited

U.S. PATENT DOCUMENTS 7,052,790 B2 *    5/2006  Nakamura ........  H01M 8/04029
                                                     429/410
2003/0091874 A1 *  5/2003  Griesmeier .......  H01M 8/04104
                                                     429/414
(Continued)

FOREIGN PATENT DOCUMENTS

CA    2942629 A1    9/2015
JP    2005-183117   7/2005
(Continued)

OTHER PUBLICATIONS

The Extended European Search Report dated Aug. 31, 2017 for the related European Patent Application No. 17167440.1.
(Continued)

*Primary Examiner* — Robert S Carrico
*Assistant Examiner* — Kwang Han
(74) *Attorney, Agent, or Firm* — McDermott Will & Emery LLP

(57) ABSTRACT

A fuel cell system having a fuel cell using a fuel gas containing a combustible gas and an oxidant gas to generate power includes an exhaust gas route for an exhaust gas from the fuel cell to circulate, an air supplier absorbing air within the fuel cell system and supplying the air to the exhaust gas, an air supply route for the air to circulate, a merging part where the exhaust gas and the air merge, a discharge route discharging a mixed gas composed of the merged exhaust gas and the air to the atmosphere, and a combustible gas detector that detects the concentration of a combustible gas in the mixed gas. With respect to flow of the air circulating in the air supply route and the discharge route, from the upstream side, the air supplier, the merging part, and the combustible gas detector are disposed in this order.

6 Claims, 2 Drawing Sheets

(51) Int. Cl.
  *H01M 8/04089* (2016.01)
  *H01M 8/04664* (2016.01)
  *H01M 8/10* (2016.01)
  *H01M 8/1018* (2016.01)

(52) U.S. Cl.
  CPC ......... *H01M 8/04679* (2013.01); *H01M 8/10* (2013.01); *H01M 2008/1095* (2013.01); *H01M 2300/0082* (2013.01)

(56) References Cited

U.S. PATENT DOCUMENTS

| | | | | |
|---|---|---|---|---|
| 2004/0185316 A1* | 9/2004 | Wells | ................ | H01M 8/04007 |
| | | | | 429/429 |
| 2008/0118810 A1* | 5/2008 | Jang | ................. | H01M 8/04074 |
| | | | | 429/415 |
| 2011/0048837 A1* | 3/2011 | Kwon | ............... | H01M 8/04097 |
| | | | | 180/309 |
| 2015/0125766 A1* | 5/2015 | Forte | ................. | H01M 8/0485 |
| | | | | 429/414 |
| 2016/0355102 A1* | 12/2016 | Friedrich | ............ | H01M 8/0662 |

FOREIGN PATENT DOCUMENTS

| | | |
|---|---|---|
| JP | 2012-212687 | 11/2012 |
| WO | 2015/124405 A1 | 8/2015 |

OTHER PUBLICATIONS

Communication pursuant to Article 94(3) EPC dated Nov. 6, 2018 for the related European Patent Application No. 17167440.1.

* cited by examiner

FUEL CELL SYSTEM WITH MERGED GASES FOR LEAK DETECTION

BACKGROUND

1. Technical Field

The present disclosure relates to fuel cell system having a fuel cell that uses a fuel gas being a hydrogen-containing gas and an oxidant gas to generate power by an electrochemical reaction between hydrogen and oxygen.

2. Description of the Related Art

In a fuel cell system, an oxidant gas and a fuel gas being a hydrogen-containing gas are supplied to a fuel cell being a power generator to generate power by an electrochemical reaction between hydrogen and oxygen. In the fuel cell system, each of a flue gas generated by burning a cathode off-gas discharged from the cathode of the fuel cell and a flue gas generated by burning an anode off-gas discharged from the anode during power generation in the fuel cell has to be discharged to the outside of the system. For this reason, a fuel cell system (fuel cell device) is proposed in which a ventilating fan is provided at an outlet that discharges exhaust gases such as the above-described cathode off-gas and flue gases to the outside so that the exhaust gases can be attenuated by air before discharged (for example, see Japanese Unexamined Patent Application Publication No. 2012-212687 and Japanese Unexamined Patent Application Publication No. 2005-183117).

SUMMARY

However, with the conventional configuration, there have been some cases where leakage of combustible gases cannot be appropriately detected. One non-limiting and exemplary embodiment provides a fuel cell system that can appropriately detect leakage of combustible gases.

In one general aspect, the techniques disclosed here feature a fuel cell system having a fuel cell that uses a fuel gas containing a combustible gas and an oxidant gas to generate power. The fuel cell system includes an exhaust gas route for an exhaust gas discharged from the fuel cell to circulate, an air supplier that absorbs air within the fuel cell system and supplies the absorbed air to the exhaust gas, an air supply route for the air absorbed by the air supplier and supplied to the exhaust gas to circulate, a merging part that is a part where the exhaust gas circulating in the exhaust gas route and the air circulating in the air supply route merge with each other, a discharge route that discharges a mixed gas composed of the exhaust gas and the air having merged at the merging part to the atmosphere, and a combustible gas detector that is provided in the discharge route and detects the concentration of a combustible gas contained in the mixed gas. With respect to flow of the air circulating in the air supply route and the discharge route, from the upstream side, the air supplier, the merging part, and the combustible gas detector are disposed in this order.

The present disclosure provides a configuration as described above and enables appropriate detection of leakage of combustible gases.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
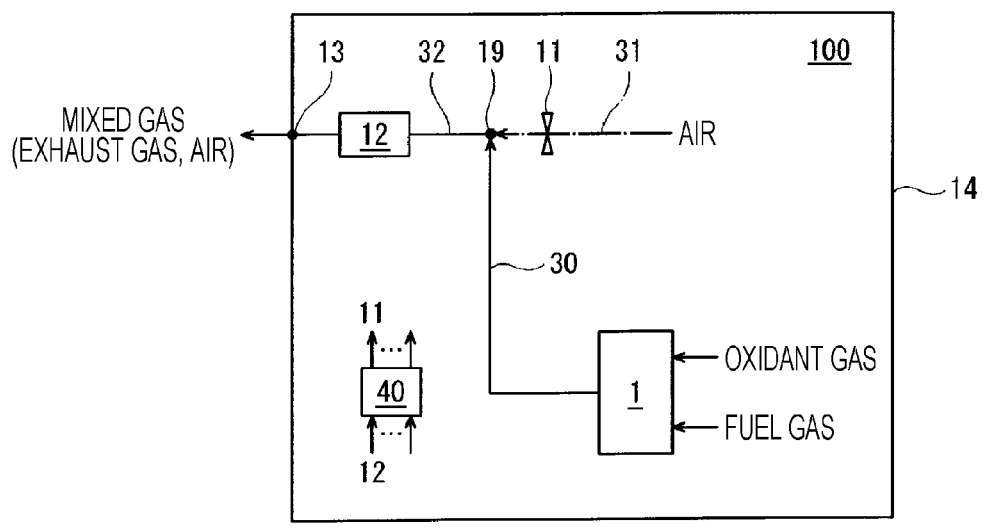
FIG. 1 is a diagram schematically illustrating an example of the configuration of a fuel cell system according to an embodiment of the present disclosure.

DETAILED DESCRIPTION (Underlying Knowledge Forming Basis of the Present Disclosure)

The inventors have found the following matter regarding the fuel cell systems (fuel cell devices) disclosed in Japanese Unexamined Patent Application Publication No. 2012-212687 and Japanese Unexamined Patent Application Publication No. 2005-183117 as a result of intensive studies. When an exhaust gas containing a combustible gas, such as an anode off-gas containing hydrogen unused for power generation, is unpredictably released, for example, there are some cases where the releasing of the exhaust gas containing a combustible gas cannot be appropriately detected. It should be noted that an exhaust gas means a gaseous body that is generated by power generation using the fuel cell and released to the atmosphere.

That is to say, with the configurations disclosed in Japanese Unexamined Patent Application Publication No. 2012-212687 and Japanese Unexamined Patent Application Publication No. 2005-183117, an outlet that discharges an exhaust gas such as a cathode off-gas and a flue gas is provided in the vicinity of an exhaust port of a ventilating fan and the exhaust gas can be attenuated by an exhaust from the ventilating fan before scattered into the atmosphere.

However, in the fuel cell systems disclosed in Japanese Unexamined Patent Application Publication No. 2012-212687 and Japanese Unexamined Patent Application Publication No. 2005-183117, a configuration in which a detection sensor that detects a combustible gas is provided at the outlet is not supposed. Because of this, it is found that even if a detection sensor is provided at the outlet in the fuel cell systems disclosed in Japanese Unexamined Patent Application Publication No. 2012-212687 and Japanese Unexamined Patent Application Publication No. 2005-183117, there are some cases where the concentration of a combustible gas cannot be appropriately detected by the detection sensor.

More specifically, as leakage of an exhaust gas containing a combustible gas, first of all, leakage from an exhaust gas route into the inside of the housing that houses the fuel cell system is thinkable. Furthermore, a case is also thinkable where an exhaust gas containing a combustible gas leaks into an exhaust gas route other than the exhaust gas route in which the exhaust gas circulates. In the latter case in particular, in the configuration in which a detection sensor is provided in the fuel cell system disclosed in Japanese Unexamined Patent Application Publication No. 2012-212687 or Japanese Unexamined Patent Application Publication No. 2005-183117, it is not necessarily that a leaked exhaust gas containing a combustible gas passes through the detection sensor, and there thus are some cases where leakage of the combustible gas cannot be appropriately detected.

In view of this, the inventors have considered a fuel cell system that can appropriately detect leakage of a combustible gas during the operation and consequently arrived at the present disclosure. The present disclosure specifically provides an aspect described below.

A fuel cell system according to a first aspect of the present disclosure includes a fuel cell that uses a fuel gas containing a combustible gas and an oxidant gas to generate power. The fuel cell system includes an exhaust gas route for an exhaust gas discharged from the fuel cell to circulate, an air supplier that absorbs air within the fuel cell system and supplies the absorbed air to the exhaust gas, an air supply route for the air absorbed by the air supplier and supplied to the exhaust gas to circulate, a merging part that is a part where the exhaust gas circulating in the exhaust gas route and the air circulating in the air supply route merge with each other, a discharge route that discharges a mixed gas composed of the exhaust gas and the air having merged at the merging part to the atmosphere, and a combustible gas detector that is provided in the discharge route and detects the concentration of a combustible gas contained in the mixed gas. With respect to flow of the air circulating in the air supply route and the discharge route, from the upstream side, the air supplier, the merging part, and the combustible gas detector are disposed in this order.

Because the above-described configuration includes an air supplier, the exhaust gas having circulated in the exhaust gas route can be attenuated by air in the discharge route before discharged to the atmosphere.

Furthermore, with respect to flow of the air circulating in the air supply route and the discharge route, from the upstream side, the air supplier, the merging part, and the combustible gas detector are disposed in this order. In other words, with this configuration, in the downstream side of the position where the air supplier is provided, the air and the exhaust gas merge with each other. With this, the exhaust gas which is humid circulates in the downstream side of the air supplier and thus prevents a breakdown of the air supplier due to water content, whereby the durability of the air supplier can be enhanced.

Furthermore, because the combustible gas detector is provided in the downstream side of the merging part, the concentration of the combustible gas contained in the mixed gas discharged to the atmosphere can be securely detected. In particular, based on the relative positional relationship with the merging part, the combustible gas detector can be provided in a position where the detection accuracy of the concentration of the combustible gas becomes high.

Furthermore, when the exhaust gas containing a combustible gas has leaked into the inside of the fuel cell system, this leaked exhaust gas can be absorbed together with the air by the air supplier and guided to the merging part. Meanwhile, when the exhaust gas route is composed of a plurality of routes and the exhaust gas containing a combustible gas has leaked from one exhaust gas route to another exhaust gas route, this leaked exhaust gas can be guided to the merging part without failure. With this, the combustible gas detector can securely detect the concentration of the combustible gas contained in the mixed gas discharged to the atmosphere.

Accordingly, the fuel cell system according to the first aspect of the present disclosure can appropriately detect leakage of a combustible gas.

A fuel cell system according to a second aspect of the present disclosure is the fuel cell system according to the above-described first aspect in which the merging part may be formed on a predetermined position in the discharge route.

According to the above-described configuration, the merging part is formed on a predetermined position in the discharge route. With this configuration, even if an exhaust gas is directed to the discharge route from a plurality of exhaust gas routes, for example, the exhaust gases can be concentrated in one position at the merging part. This enables the combustible gas contained in the mixed gas to be discharged to the atmosphere to appropriately contact the combustible gas detector provided in the downstream side of the merging part. Furthermore, because the merging part is formed on a predetermined position in the discharge route, the mixing condition of the air and the exhaust gas in the mixed gas at the timing of detection by the combustible gas detector can be constant, whereby a variation in the detection results from the combustible gas detector can be prevented from being caused by a difference in the mixing condition. This enables easy estimation of the correspondence between the concentration of the combustible gas contained in the mixed gas and the concentration of the combustible gas contained in the mixed gas actually discharged to the atmosphere. With this, the concentration of the combustible gas contained in the mixed gas discharged to the atmosphere can be accurately calculated.

A fuel cell system according to a third aspect of the present disclosure is the fuel cell system according to the above-described first or second aspect in which the exhaust gas route includes a plurality of routes that circulate the exhaust gas and a mixed off-gas route that collects the exhaust gas circulating in the plurality of routes and releases the collected exhaust gas to the merging part.

With the above-described configuration, even if the combustible gas has mixed in any of the plurality of routes that circulate the exhaust gas, this leaked combustible gas can be guided to the merging part without failure via the mixed off-gas route.

With this, the combustible gas detector provided in the downstream side of the merging part can detect the combustible gas having leaked and mixed in the exhaust gas route without failure.

A fuel cell system according to a fourth aspect of the present disclosure is the fuel cell system according to any one of the above-described first or third aspects that may further include a controller. The controller may determine generation of leakage of a combustible gas based on the concentration of a combustible gas detected by the combustible gas detector, and may stop power generation in the fuel cell upon determining that leakage of a combustible gas is generated.

A fuel cell system according to a fifth aspect of the present disclosure is the fuel cell system according to any one of the above-described first or fourth aspects that may further include a housing that houses the fuel cell system, in which the air supplier may be a ventilation blower that ventilates air in the inside of the housing.

With the above-described configuration, even if an anode off-gas containing a combustible gas has been released into the housing due to leakage, this leaked anode off-gas can be guided to the merging part via the air supply route by the ventilation blower to be supplied to the combustible gas detector. With this, even if an anode off-gas containing a combustible gas has been leaked into the housing, the concentration of the combustible gas increased by this leakage can be securely detected by the combustible gas detector.

A fuel cell system according to a sixth aspect of the present disclosure is the fuel cell system according to any one of the above-described first or fourth aspects that may further include a housing that houses the fuel cell system, a cooling water route for cooling water for cooling the fuel cell to circulate during power generation, and a radiator that is provided in the cooling water route and cools heated cooling water by cooling the fuel cell. The air supplier may be a blower for radiation that absorbs air in the inside of the housing and supplies cooling air to the radiator.

With the above-described configuration, without separately providing a ventilation blower for ventilating air in the inside of the housing, a blower for radiation that supplies cooling air to the radiator can function also as the ventilation blower. As described above, a ventilation blower does not have to be provided separately, and the production cost thus can be reduced. Furthermore, because the blower for radiation can function as the ventilation blower, even if an anode off-gas containing a combustible gas has been leaked into the housing, this leakage can be securely recognized with a detection result from the combustible gas detector.

A fuel cell system according to a seventh aspect of the present disclosure is the fuel cell system according to any one of the above-described first or sixth aspects that may further include a fuel gas route that supplies a fuel gas to the anode of the fuel cell and a recycle route that returns, to the fuel gas route, an anode off-gas that contains hydrogen unused for power generation in the fuel cell and is discharged from the anode of the fuel cell.

With the above-described configuration, an anode off-gas containing hydrogen unused for power generation in the fuel cell can be used again for power generation in the fuel cell. This enables reduction in the power generation cost in a fuel cell system having a configuration in which pure hydrogen being a fuel gas is directly supplied to the fuel cell from the outside to be used for power generation, for example.

Embodiments will be described below with reference to the drawings.

Embodiment (Configuration of Fuel Cell System)

Firstly, a configuration of a fuel cell system 100 according to an embodiment will be described with reference to FIG. 1. FIG. 1 is a diagram schematically illustrating an example of the configuration of the fuel cell system 100 according to an embodiment of the present disclosure.

As illustrated in FIG. 1, the fuel cell system 100 includes a fuel cell 1, an air supplier 11, a combustible gas detector 12, a merging part 19, an exhaust gas route 30, an air supply route 31, a discharge route 32, and a controller 40. The fuel cell system 100 includes the fuel cell 1 that uses a fuel gas containing hydrogen as a combustible gas and an oxidant gas to generate power. More specifically, in the fuel cell system 100, the fuel gas is supplied to the anode (fuel electrode) of the fuel cell 1 and the oxidant gas is supplied to the cathode (air electrode). In the fuel cell 1, power is generated by an electrochemical reaction between hydrogen and oxygen.

As the fuel cell 1, a polymer electrolyte fuel cell (PEFC) can be exemplified, for example. The fuel gas containing hydrogen may be hydrogen supplied from an external hydrogen supply device and may be a hydrogen containing gas being hydrogen-rich that is formed by reforming a raw material for power generation such as a city gas in a reformer. As the oxidant gas, air can be exemplified, for example.

From the cathode of the fuel cell 1, a cathode off-gas is discharged as an exhaust gas. From the anode, an anode off-gas is discharged as an exhaust gas. The exhaust gases discharged from the fuel cell 1 circulate in the exhaust gas route 30. It should be noted that the cathode off-gas and the anode off-gas are collectively referred to as an exhaust gas in the present embodiment. Furthermore, when the fuel cell system 100 has a configuration in which the anode off-gas containing hydrogen unused for power generation is burned to generate a flue gas, the flue gas thus generated is contained in the exhaust gas according to the present embodiment.

To attenuate the exhaust gas, the air supplier 11 absorbs air within the fuel cell system 100 based on a control instruction from the controller 40 and supplies the absorbed air to the exhaust gas. It should be noted that each unit of the fuel cell system 100 is housed in the housing 14, and the air supplier 11 may be a ventilation blower for ventilating air in the inside of the housing 14, for example. Alternatively, a radiator such as a cooling radiator is provided in the housing 14, the air supplier 11 may be a blower for radiation that supplies cooling air to the radiator.

The air supplied by the air supplier 11 circulates in the air supply route 31 to be directed to the merging part 19. Thereafter, at the merging part 19, the exhaust gas having circulated in the exhaust gas route 30 and the air having circulated in the air supply route 31 merge with each other. The mixed gas composed of the air and the exhaust gas having merged at the merging part 19 circulates in the discharge route 32 to be discharged from the housing 14 to the atmosphere via a discharge port 13.

The combustible gas detector 12 is provided in the discharge route 32 and detects the concentration of the combustible gas contained in the exhaust gas. For example, in the exhaust gas, as a combustible gas, hydrogen unused for power generation in the fuel cell 1 may be contained. For this reason, based on the concentration of the combustible gas contained in the mixed gas that has been detected by the combustible gas detector 12, the controller 40 determines presence or absence of generation of leakage of the combustible gas within the fuel cell system 100. Upon determining that leakage of the combustible gas is generated, the controller 40 stops power generation in the fuel cell 1. The controller 40 controls various operations of the units included in the fuel cell system 100 and may include a computation processor which is not illustrated and a storage that stores therein a control program and is not illustrated, for example. As the computation processor, a structure formed of one or more computation circuits can be exemplified, for example. As the computation circuit, a microprocessor (MPU) or a CPU can be exemplified, for example. As the storage, a structure formed of one or more storage circuits can be exemplified, for example. As the storage circuit, a semiconductor memory can be exemplified, for example. The controller 40 may be formed of an independent controller that performs centralized control of the units in the fuel cell system 100, and may be formed of a plurality of controllers that cooperate with each other to perform distributed control.

In the fuel cell system 100 according to the embodiment, with respect to flow of the air circulating in the air supply route 31 and the discharge route 32, from the upstream side, the air supplier 11, the merging part 19, and the combustible gas detector 12 are disposed in this order. In other words, the air supplied via the air supply route 31 and the exhaust gas supplied via the exhaust gas route 30 merge with each other at the merging part 19 and the mixed gas composed of the air and the exhaust gas circulates in the discharge route 32. The concentration of the combustible gas contained in the mixed gas circulating in the discharge route 32 is detected by the combustible gas detector 12.

More specifically, in the fuel cell system 100 according to the embodiment, the air supplied by the air supplier 11 and the exhaust gas having entered into the discharge route 32 via the exhaust gas route 30 merge with each other at the merging part 19 formed on a predetermined position in the discharge route 32 to be mixed with each other. Thereafter, this mixed gas composed of the exhaust gas and the air circulates in the discharge route 32 to arrive at the combustible gas detector 12 and then is discharged to the atmosphere from the inside of the housing 14. With this, in the fuel cell system 100, the exhaust gas can be attenuated by air before discharged to the atmosphere.

The exhaust gas circulating within the discharge route 32 is hard to be uniformly mixed with the air. For this reason, in the mixed gas, there is to be a concentration distribution of the combustible gas contained in the exhaust gas. If there are a plurality of entering positions of the exhaust gas into the discharge route 32 and the exhaust gas merges with the air supplied by the air supplier 11 at the different positions, there are to be a plurality of concentration distributions of the combustible gas in accordance with the number of the entering positions. With this, when there are a plurality of entering positions of the exhaust gas into the discharge route 32, the appropriate concentration of the combustible gas contained in the mixed gas cannot be detected with a single combustible gas detector 12, and the controller 40 thus cannot appropriately determine presence or absence of leakage of the combustible gas.

However, in the fuel cell system 100 according to the embodiment, there is only one entering position of the exhaust gas into the discharge route 32, and the air and the exhaust gas merge with each other at the merging part 19 formed on a predetermined position within the discharge route 32.

With this, even if the exhaust gas circulates in each of a plurality of exhaust gas routes 30 . . . to be directed to the discharge route 32, for example, the exhaust gas can be collected at one position at the merging part 19. For this reason, the combustible gas contained in the mixed gas that is to be discharged to the atmosphere can be controlled to appropriately contact the combustible gas detector 12 provided in the downstream side of the merging part 19. Furthermore, because the merging part 19 is formed on only one position, the mixing condition of the air and the exhaust gas in the mixed gas at the timing of detection by the combustible gas detector 12 can be constant, whereby a variation in the detection results from the combustible gas detector 12 can be prevented from being caused by a difference in the mixing condition. This enables easy estimation of the correspondence between the concentration of the combustible gas contained in the mixed gas and the concentration of the combustible gas contained in the mixed gas actually discharged to the atmosphere. With this, the concentration of the combustible gas contained in the mixed gas discharged to the atmosphere can be accurately calculated.

Furthermore, because the correspondence between the concentration of the combustible gas contained in the mixed gas and the concentration of the combustible gas contained in the mixed gas actually discharged to the atmosphere can be easily estimated, a determination threshold for the controller 40 to determine presence or absence of leakage of the combustible gas can be appropriately set. This enables accurate determination of presence or absence of leakage of the combustible gas. It should be noted that this determination threshold is a threshold provided to determine presence or absence of leakage of the combustible gas and can be set as appropriate based on whether the threshold is within the range of the concentration of the combustible gas contained in the mixed gas during the normal operation.

Furthermore, in the fuel cell system 100 according to the embodiment, with respect to flow of the supplied air, from the upstream side, the air supplier 11, the merging part 19, and the combustible gas detector 12 are disposed in this order. With this configuration, in the downstream side of the position where the air supplier 11 is provided, the air and the exhaust gas merge with each other. With this, the air supplier 11 is not exposed to the exhaust gas which is humid, whereby the durability of the air supplier 11 is enhanced.

First Example

Figure 2:
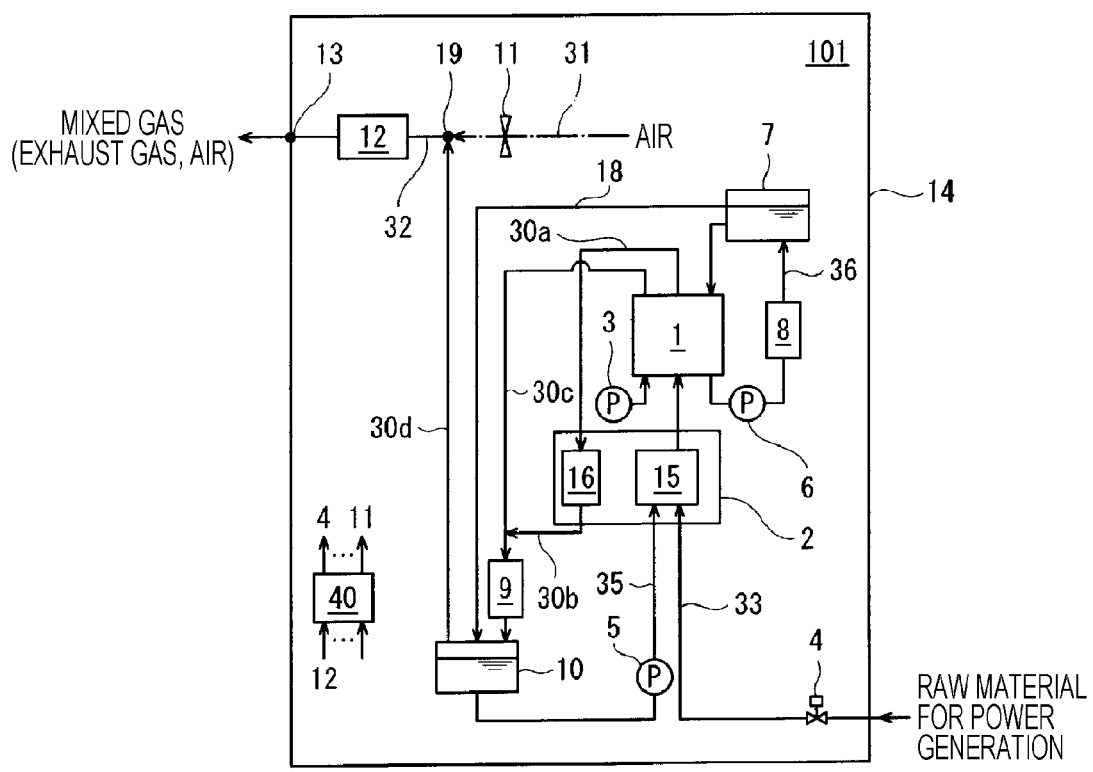
FIG. 2 is a diagram schematically illustrating an example of the configuration of a fuel cell system according to a first example of the embodiment of the present disclosure.

Next, with reference to FIG. 2, a first example of the fuel cell system 100 according to the embodiment which is illustrated in FIG. 1 will be described. FIG. 2 is a diagram schematically illustrating an example of the configuration of a fuel cell system 101 according to the first example of the embodiment of the present disclosure.

As illustrated in FIG. 2, in the structure of the fuel cell system 100 according to the embodiment described above, the fuel cell system 101 according to the first example further includes a hydrogen generator 2, an oxidant gas supplier 3, a supply valve 4, a reformed water supply pump 5, a water pump 6, a cooling water tank 7, a heat exchanger 8, a condenser 9, a condensed water tank 10, a communication route 18, a raw material supply route 33, a condensed water route 35, and a cooling water route 36. Furthermore, the exhaust gas route 30 is composed of an anode off-gas route 30a, a flue gas route 30b, a cathode off-gas route 30c, and a mixed off-gas route 30d.

The raw material supply route 33 is a route for a raw material for power generation such as a city gas to circulate. In the fuel cell system 101 according to the first example, when the raw material for power generation is a city gas, for example, the raw material supply route 33 is connected to a city gas pipe which is externally provided and is not illustrated at one end and connected to the hydrogen generator 2 at the other end. Based on a control instruction from the controller 40, the supply valve 4 provided in the raw material supply route 33 is opened, whereby the raw material for power generation circulates in the raw material supply route 33 to be supplied to the hydrogen generator 2. It should be noted that, in the first example, the raw material for power generation to be supplied is supplied to the hydrogen generator 2 when the supply valve 4 is opened. However, the embodiment is not limited thereto. For example, a pressurizer such as a booster pump may be provided in the raw material supply route 33 so that the pressurizer supplies the raw material for power generation to the hydrogen generator 2.

The hydrogen generator 2 generates a hydrogen containing gas as a fuel gas to be supplied to the fuel cell 1 from the supplied raw material for power generation. The hydrogen generator 2 incorporates a reformer 15 and a burner 16 provided adjacent to the reformer 15. The reformer 15 uses reformed water that has been supplied to generate a hydrogen containing gas being hydrogen-rich from the raw material for power generation by steam reforming reaction. At this point, in the generated fuel gas, much carbon monoxide is contained. For this reason, the hydrogen generator 2 may supply the fuel gas to the fuel cell 1 in a state in which the concentration of the carbon monoxide contained in the fuel gas is reduced to around 10 ppm by a transformer or a selective oxidation reactor which is not illustrated, for example.

As described above, the fuel gas is supplied to the anode side of the fuel cell 1 and the oxidant gas is supplied to the cathode side. In the fuel cell 1, power is generated by an electrochemical reaction between hydrogen and oxygen. It should be noted that the air being the oxidant gas is supplied to the fuel cell 1 by the oxidant gas supplier 3. As the oxidant gas supplier 3, a blower or a sirocco fan can be exemplified.

In the anode off-gas being the exhaust gas discharged from the anode of the fuel cell 1, hydrogen that has not been used for power generation is contained. For this reason, the anode off-gas is supplied to the burner 16 incorporated in the hydrogen generator 2 and burned at the burner 16 together with the supplied air which is not illustrated. The heat generated by the burning at the burner 16 is used for steam reforming reaction performed at the reformer 15. The flue gas being the exhaust gas generated by the burning at the burner 16 and the cathode off-gas being the exhaust gas discharged from the cathode are supplied together to the condenser 9.

As illustrated in FIG. 2, in the fuel cell system 101 according to the first example, the anode off-gas discharged from the anode of the fuel cell 1 circulates in the anode off-gas route 30a to be supplied to the burner 16 included in the hydrogen generator 2. Furthermore, the flue gas generated by the burner 16 circulates in the flue gas route 30b to be directed to condenser 9. Meanwhile, the cathode off-gas discharged from the cathode of the fuel cell 1 circulates in the cathode off-gas route 30c to be directed to the condenser 9. In the fuel cell system 101 according to the first example, before arriving at the condenser 9, the flue gas route 30b and the cathode off-gas route 30c merge with each other so that the flue gas and the cathode off-gas are guided together to the condenser 9. It should be noted that, in addition to the anode off-gas route 30a, the flue gas route 30b, and the cathode off-gas route 30c, the mixed off-gas route 30d described later corresponds to the exhaust gas route 30 according to the embodiment.

The condenser 9 condenses the cathode off-gas and the flue gas and can be implemented by a heat exchanger that performs heat exchange of the cathode off-gas, the flue gas, and water circulating in a water route which is not illustrated, for example. More specifically, in the condenser 9, the cathode off-gas and the flue gas are condensed by heat exchange with water circulating in a water route which is not illustrated, for example. The cathode off-gas and the flue gas with the absolute humidity thereof reduced by this condensation are supplied to the condensed water tank 10 together with the condensed water.

The condensed water tank 10 is a tank that stores therein the condensed water obtained from the cathode off-gas and the flue gas by the condensation at the condenser 9. The condensed water tank 10 performs gas-liquid separation of the cathode off-gas and the flue gas supplied from the condenser 9 and the condensed water. Thereafter, the gas-liquid separated cathode off-gas and flue gas circulate in the mixed off-gas route 30d from the condensed water tank 10 to be supplied to the merging part 19 in the discharge route 32, and the condensed water is stored in the condensed water tank 10.

The condensed water stored in the condensed water tank 10 is pressurized by the reformed water supply pump 5 and circulates in the condensed water route 35 to be supplied to the reformer 15 as reformed water. In other words, the condensed water route 35 is connected to the condensed water tank 10 at one end and connected to the reformer 15 of the hydrogen generator 2 at the other end. In the middle of the condensed water route 35, the reformed water supply pump 5 is provided. It should be noted that an ion exchange resin which is not illustrated may be further provided in the condensed water route 35 to convert the condensed water into ion exchanged water and supply the ion exchanged water to the reformer 15.

Furthermore, in the fuel cell 1, heat is generated during power generation. For this reason, the fuel cell system 101 according to the first example has a configuration described below in order to collect this heat generated in the fuel cell 1 during power generation by cooling water. That is, the fuel cell system 101 includes the cooling water tank 7 that stores therein cooling water, the cooling water route 36 being a circulation route that causes the cooling water stored in the cooling water tank 7 to pass through the fuel cell 1 and the heat exchanger 8 before returning to the cooling water tank 7, and a water pump 6 that causes the cooling water to circulate in the cooling water route 36. When the cooling water stored in the cooling water tank 7 passes through the fuel cell 1, the cooling water collects the heat generated in the fuel cell 1. The cooling water heated by the collected heat is pressurized by the water pump 6 and arrives at the heat exchanger 8. In addition to the cooling water route 36, a water circulation route which is not illustrated also circulates in the heat exchanger 8 so that heat exchange is performed between the heated cooling water and the water circulating in the water circulation route. The cooling water is cooled by this heat exchange before returning to the cooling water tank 7.

Furthermore, the cooling water tank 7 has a function of degassing dissolved air from the cooling water and releasing the dissolved air from the cooling water route 36. The released dissolved air is supplied to the condensed water tank 10 via the communication route 18 and then circulates in the mixed off-gas route 30d together with the cathode off-gas and the flue gas to be guided to the discharge route 32.

As described above, the units included in the fuel cell system 101 are built in the housing 14, and the air supplier 11 is provided as a ventilating fan that performs ventilation of the inside of the housing 14. Furthermore, as illustrated in FIG. 2, based on a control instruction from the controller 40, the air sent out by the air supplier 11 and the cathode off-gas, the flue gas, and the dissolved air guided to the discharge route 32 via the mixed off-gas route 30d merge with each other at the merging part 19 in the discharge route 32. Thereafter, the air and the cathode off-gas, the flue gas, and the dissolved air that have merged with each other at the merging part 19 are mixed to circulate in the discharge route 32 as the mixed gas and be discharged to the outside from the discharge port 13.

In the discharge route 32, at the position in the downstream side of the merging part 19 in the stream of the air, the combustible gas detector 12 is provided. The combustible gas detector 12 detects the concentration of the combustible gas in the installation environment thereof (the concentration of the combustible gas contained in the mixed gas circulating in the discharge route 32). In the fuel cell system 101 according to the first example, when the concentration of the combustible gas contained in the mixed gas that has been detected by the combustible gas detector 12 is equal to or smaller than the determination threshold, the controller 40 determines that the state is normal and continues the power generation in the fuel cell 1. By contrast, when the concentration of the combustible gas contained in the mixed gas that has been detected by the combustible gas detector 12 is larger than the determination threshold, the controller 40 determines that leakage of the combustible gas is generated in the fuel cell system 101 and controls to stop the power generation in the fuel cell 1.

A factor described below causes leakage of the combustible gas generated in the fuel cell system 101. Firstly, in any of the raw material supply route 33, the routes in which the hydrogen containing gas generated in the reformer 15 circulates until arriving at the fuel cell 1, and the anode off-gas route 30a, there is a damage due to degradation over time or overpressure, whereby the gas flows out within the housing 14. In this case, the air within the housing 14 can be guided to the discharge route 32 by the air supplier 11 to be supplied to the combustible gas detector 12. With this, when the combustible gas is leaked due to the above-described factor, the gas leakage can be detected by the combustible gas detector 12.

Another factor described below also causes leakage of the combustible gas. That is, in the fuel cell 1, the oxidant gas supplied to the cathode side and the fuel gas supplied to the anode side are shut off from each other with an electrolyte film which is not illustrated. However, when the electrolyte film is damaged due to degradation over time or overpressure, for example, the fuel gas enters into the oxidant gas side via the damaged electrolyte film. The fuel gas having leaked due to this disorder circulates in the cathode off-gas route 30c, the condensed water tank 10, and the mixed off-gas route 30d in this order to be guided to the discharge route 32. With this, the combustible gas leaked due to the damage of the electrolyte film also can be detected by the combustible gas detector 12 provided in the discharge route 32.

Furthermore, in the fuel cell 1, the cooling water route 36 in which the cooling water used for cooling the fuel cell 1 during power generation circulates is disposed on the outside of a separator which is not illustrated. That is, in the fuel cell 1, the anode of the fuel cell 1 and the cooling water route 36 are shut off from each other with the separator. At this point, even when the separator is damaged due to degradation over time or overpressure, for example, the damage is water-sealed by the cooling water circulating in the cooling water route 36. With this configuration, the fuel gas (combustible gas) supplied to the anode does not flow out to the side of the cooling water route 36 from the damaged part.

However, when larger overpressure is generated on the anode side, this water seal may be broken. When the water seal is broken, in the fuel cell system 101 according to the first example, the fuel gas (combustible gas) supplied to the anode enters into the cooling water route 36 from the fuel cell 1 to be guided to the cooling water tank 7. The combustible gas guided to the cooling water tank 7 is guided to the condensed water tank 10 via the communication route 18 provided between the cooling water tank 7 and the condensed water tank 10. Thereafter, the exhaust gas containing the combustible gas is guided to the discharge route 32 via the mixed off-gas route 30d to merge with the air sent out from the air supplier 11 at the merging part 19. As described above, the exhaust gas containing the combustible gas having leaked into the cooling water route 36 from the fuel cell 1 due to the damage of the separator can be detected by the combustible gas detector 12 provided in the downstream side of the merging part 19 in the discharge route 32.

In any case of the above-described factors of leakage of the combustible gas, the exhaust gas containing the leaked combustible gas is collected at the merging part 19 without failure to be mixed with the air supplied by the air supplier 11. The exhaust gas then becomes the mixed gas before arriving at the combustible gas detector 12 where the concentration of the combustible gas contained in the mixed gas is detected. For this reason, regardless of the factor of leakage of the combustible gas, in the fuel cell system 101, the controller 40 can determine presence or absence of leakage of the combustible gas.

When the concentration of the combustible gas contained in the mixed gas circulating in the discharge route 32 is equal to or smaller than the determination threshold, the controller 40 determines that the state is normal and continues the power generation in the fuel cell 1. When the concentration of the combustible gas contained in the mixed gas circulating in the discharge route 32 is larger than the determination threshold, the controller 40 determines that the gas leakage is generated and controls to stop the power generation in the fuel cell 1.

Second Example

Figure 3:
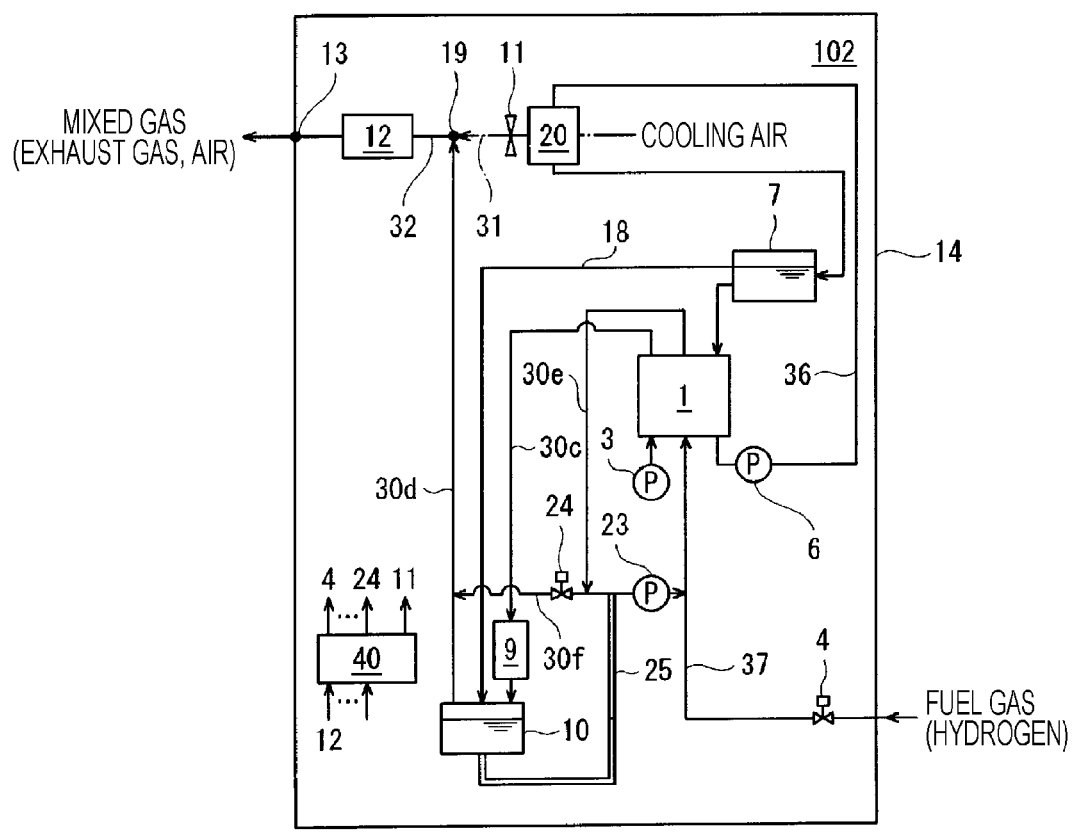
FIG. 3 is a diagram schematically illustrating an example of the configuration of a fuel cell system according to a second example of the embodiment of the present disclosure.

Next, with reference to FIG. 3, a second example of the fuel cell system 100 according to the embodiment will be described. FIG. 3 is a diagram schematically illustrating an example of the configuration of a fuel cell system 102 according to the second example of the embodiment of the present disclosure. It should be noted that, in FIG. 3, in order to clarify the state of water seal by the condensed water in a condensed water communication route 25 described later, the condensed water communication route 25 is represented by a double line and the state of the condensed water stored in the route is indicated. Other routes than that are represented by a single line as in FIGS. 1 and 2.

As illustrated in FIG. 3, in the structure of the fuel cell system 100 according to the embodiment described above, the fuel cell system 102 according to the second example further includes the oxidant gas supplier 3, the supply valve 4, the water pump 6, the cooling water tank 7, the condenser 9, the condensed water tank 10, the communication route 18, a radiator 20, a recycle pump 23, a shut-off valve 24, the condensed water communication route 25, the cooling water route 36, and a fuel gas route 37.

In other words, the configuration of the fuel cell system 102 according to the second example differs from that of the fuel cell system 101 according to the above-described first example in that the fuel gas route 37 is included instead of the raw material supply route 33 and the hydrogen generator 2 is not included. The fuel cell system 102 according to the second example also differs in that, instead of the heat exchanger 8 provided in the middle of the cooling water route 36 in the fuel cell system 101 according to the first example, in the middle of the cooling water route 36 in the fuel cell system 102 according to the second example, the radiator 20 is provided. Furthermore, the fuel cell system 102 according to the second example also differs in that, although the air supplier 11 according to the first example functions as a ventilating fan, the air supplier 11 according to the second example functions as a cooling fan that sends out the cooling air for cooling the radiator 20. It should be noted that the air supplier 11 according to the second example also has a function as a ventilating fan that performs ventilation of the air within the housing 14 as well as the above-described function as the cooling fan. The fuel cell system 102 according to the second example also differs in that the condensed water communication route 25 is included instead of the condensed water route 35.

Furthermore, the configuration of the exhaust gas route 30 is different between the first example and the second example. More specifically, in the first example, the exhaust gas route 30 according to the embodiment is composed of the anode off-gas route 30*a*, the flue gas route 30*b*, the cathode off-gas route 30*c*, and the mixed off-gas route 30*d*. However, the second example differs in that the exhaust gas route 30 according to the embodiment is composed of the cathode off-gas route 30*c*, the mixed off-gas route 30*d*, and an impurity discharge route 30*f*, and in the impurity discharge route 30*f*, the shut-off valve 24 is provided.

The configuration of the fuel cell system 102 according to the second example also differs from that of the fuel cell system 101 according to the first example in that the recycle route 30*e* is further included to return the anode off-gas containing hydrogen unused for power generation to the fuel gas route 37. Besides those points, the fuel cell system 102 according to the second example includes the same components as in the fuel cell system 101 according to the first example. The same components are denoted by the same reference characters and the descriptions thereof will be omitted.

As described above, the fuel cell system 102 according to the second example does not include the hydrogen generator 2 and has a configuration in which the hydrogen is directly supplied to the fuel cell 1 as a fuel gas from the outside. That is, the fuel cell 1 is connected to a hydrogen supply device which is externally provided and is not illustrated via the fuel gas route 37. The fuel gas (hydrogen) is supplied to the fuel cell 1 from the hydrogen supply device by opening the supply valve 4 provided in the middle of the fuel gas route 37, based on a control instruction from the controller 40. This is not especially illustrated, but the hydrogen supplied to the fuel cell 1 may be humidified in advance by a humidifier, for example. In the fuel cell system 102 according to the second example has a configuration in which the fuel gas is supplied to the fuel cell 1 by opening the supply valve 4, but the embodiment is not limited thereto. For example, a pressurizer (not illustrated) such as a booster pump may be included in the fuel gas route 37 so that the pressurizer supplies the fuel gas to the fuel cell 1.

In the fuel cell 1, the fuel gas is supplied to the anode side and the oxidant gas is supplied to the cathode side, so that power is generated by an electrochemical reaction between hydrogen and oxygen. It should be noted that the air being the oxidant gas is supplied to the fuel cell 1 by the oxidant gas supplier 3. As the oxidant gas supplier 3, a blower or a sirocco fan can be exemplified.

The cathode off-gas being the exhaust gas discharged from the cathode of the fuel cell 1 is supplied to the condenser 9, as in the first example. The condenser 9 is to condense the cathode off-gas and can be implemented by a heat exchanger that performs heat exchange between the cathode off-gas and water circulating in a water route which is not illustrated, for example. More specifically, in the condenser 9, the cathode off-gas is condensed by heat exchange with water circulating in a water route which is not illustrated, for example. The cathode off-gas with the absolute humidity thereof reduced by this condensation is supplied to the condensed water tank 10 together with the condensed water.

Meanwhile, the anode off-gas containing hydrogen unused for power generation in the fuel cell 1 is discharged from the anode into the recycle route 30*e*, pressurized by the recycle pump 23, and returned to the fuel gas route 37. With this, the anode off-gas containing hydrogen unused for power generation can be used again for power generation. It should be noted that, as described above, the fuel gas supplied to the fuel cell 1 may be supplied in a state in which the fuel gas is humidified by a humidifier, for example. In the case of the configuration in which the fuel gas is supplied to the fuel cell 1 in a humidified state, when the anode off-gas circulating in the recycle route 30*e* is cooled by heat release, for example, condensed water is generated in this recycle route 30*e*. The condensed water thus has to be discharged from the recycle route 30*e*. In the fuel cell system 102 according to the second example, the condensed water communication route 25 that branches off from the recycle route 30*e* to be connected to the condensed water tank 10 is provided. The condensed water communication route 25 is connected to a position below the water surface of the condensed water in the condensed water tank 10, in particular, the bottom or the vicinity of the bottom of the condensed water tank 10. The condensed water generated in the recycle route 30*e* is thus supplied to the condensed water tank 10 via the condensed water communication route 25. It should be noted that the middle of the condensed water communication route 25 is water-sealed by the condensed water stored in the condensed water tank 10, so that the anode off-gas circulating in the recycle route 30*e* will never be released into the condensed water tank 10.

The condensed water tank 10 is a tank that stores therein the condensed water obtained from the cathode off-gas by the condensation at the condenser 9 and the condensed water obtained from the anode off-gas circulating in the recycle route 30*e*. In the condensed water tank 10, the cathode off-gas supplied from the condenser 9 and the condensed water are gas-liquid separated. Thereafter, while the gas-liquid separated cathode off-gas circulates in the mixed off-gas route 30*d* to be supplied to the merging part 19 in the discharge route 32 from the condensed water tank 10, the condensed water is stored in the condensed water tank 10.

The condensed water in the condensed water tank 10 according to the second example is not used as reformed water unlike the condensed water in the condensed water tank 10 according to the first example. With this, as the operation of the fuel cell system 102 according to the second example continues, the condensed water stored in the condensed water tank 10 increases. For this reason, the condensed water tank 10 according to the second example includes an overflow route which is not illustrated for discharging the condensed water to the outside when the amount of the condensed water stored in the condensed water tank 10 exceeds a predetermined amount.

Furthermore, in the fuel cell 1, heat is generated during power generation. For this reason, the fuel cell system 102 according to the second example has a configuration described below in order to collect this heat generated in the fuel cell 1 during power generation by cooling water. That is, the fuel cell system 102 includes the cooling water tank 7 that stores therein cooling water, the cooling water route 36 being a circulation route that causes the cooling water stored in the cooling water tank 7 to pass through the fuel cell 1 and the radiator 20 before returning to the cooling water tank 7, and a water pump 6 that causes the cooling water to circulate in the cooling water route 36. When the cooling water stored in the cooling water tank 7 passes through the fuel cell 1, the cooling water collects the heat generated in the fuel cell 1. The cooling water heated by the collected heat is pressurized by the water pump 6 and arrives at the radiator 20. The heated cooling water is cooled by the cooling air supplied to the radiator 20 by the air supplier 11 when passing through the radiator 20 before returning to the cooling water tank 7.

The cooling water tank 7 has a function of degassing dissolved air from the cooling water and releasing the dissolved air from the cooling water route 36. The released dissolved air is supplied to the condensed water tank 10 via the communication route 18 and then circulates in the mixed off-gas route 30*d* together with the cathode off-gas to be guided to the discharge route 32.

The units included in the fuel cell system 102 are built in the housing 14. Furthermore, as illustrated in FIG. 2, the cooling air sent out by the air supplier 11 passes through the radiator 20 and the air supplier 11 to be guided to the merging part 19 in the discharge route 32. Thereafter, the cooling air merges with the cathode off-gas guided to the discharge route 32 via the mixed off-gas route 30*d*, the dissolved air, and the anode off-gas containing an impurity described later at the merging part 19 in the discharge route 32. The cooling air, the cathode off-gas, the dissolved air, and the anode off-gas containing an impurity that have merged with each other at the merging part 19 are mixed to circulate in the discharge route 32 as the mixed gas and be discharged to the outside from the discharge port 13.

In the discharge route 32, at the position in the downstream side of the merging part 19 in the stream of the air, the combustible gas detector 12 is provided. The combustible gas detector 12 detects the concentration of the combustible gas in the installation environment thereof (the concentration of the combustible gas contained in the mixed gas circulating in the discharge route 32). In the fuel cell system 102 according to the second example, when the concentration of the combustible gas contained in the mixed gas that has been detected by the combustible gas detector 12 is equal to or smaller than the determination threshold, the controller 40 determines that the state is normal and continues the power generation in the fuel cell 1. By contrast, when the concentration of the combustible gas contained in the mixed gas that has been detected by the combustible gas detector 12 is larger than the determination threshold, the controller 40 determines that leakage of the combustible gas is generated in the fuel cell system 102 and controls to stop the power generation in the fuel cell 1.

In the fuel cell system 102 according to the second example, the anode off-gas discharged from the anode of the fuel cell 1 circulates in the recycle route 30*e* to be returned to the fuel gas route 37. This recycle route 30*e* is connected to the impurity discharge route 30*f* in the middle thereof, and in the vicinity of the part connecting to the recycle route 30*e* in the impurity discharge route 30*f*, the shut-off valve 24 is provided. More specifically, in the recycle route 30*e*, when the power generation in the fuel cell 1 continues, the concentration of the impurity contained in the anode off-gas increases over time. The impurity thus has to be discharged from the recycle route 30*e* periodically.

The fuel cell system 102 according to the second example thus opens the shut-off valve 24 in accordance with a control instruction from the controller 40 periodically to release the anode off-gas containing the impurity from the recycle route 30*e* to the impurity discharge route 30*f*. The impurity discharge route 30*f* is connected to the recycle route 30*e* at one end as described above and connected to the mixed off-gas route 30*d* at the other end. With this, the anode off-gas released from the recycle route 30*e* with the shut-off valve 24 opened is guided to the discharge route 32 via the impurity discharge route 30*f* and the mixed off-gas route 30*d*. It should be noted that the anode off-gas is mixed with the cathode off-gas and the dissolved air that have been discharged from the condensed water tank 10 in the mixed off-gas route 30*d* to be guided to the discharge route 32.

The controller 40 controls the opening time of the shut-off valve 24 such that when the shut-off valve 24 is opened, the concentration of the combustible gas contained in the mixed gas that is detected by the combustible gas detector 12 provided in the discharge route 32 becomes smaller than the determination threshold. In such a manner, the flow rate of the anode off-gas guided to the discharge route 32 can be adjusted with the controller 40 controlling the opening time of the shut-off valve 24. However, the adjustment method of the flow rate of the anode off-gas guided to the discharge route 32 is not limited to the configuration in which the opening time of the shut-off valve 24 is controlled. For example, an appropriate pressure loss may be set to the shut-off valve 24 in the opened state, so that when the shut-off valve 24 is opened, the flow rate of the anode off-gas guided to the discharge route 32 is adjusted.

A factor described below causes leakage of the combustible gas generated in the fuel cell system 102 according to the second example.

Firstly, in the fuel gas route 37 or the recycle route 30*e*, there is a damage due to degradation over time or overpressure, whereby the combustible gas flows out within the housing 14. In this case, the air within the housing 14 can be guided to the discharge route 32 by the air supplier 11 to be supplied to the combustible gas detector 12. With this, when the combustible gas is leaked due to the above-described factor, the controller 40 can determine presence or absence of the gas leakage based on the detection result from the combustible gas detector 12.

Another factor described below also causes leakage of the combustible gas. That is, in the fuel cell 1, the oxidant gas supplied to the cathode side and the fuel gas supplied to the anode side are shut off from each other with an electrolyte film which is not illustrated. However, when the electrolyte film is damaged due to degradation over time or overpressure, for example, the fuel gas enters into the oxidant gas side via the damaged electrolyte film. The fuel gas having leaked due to this disorder circulates in the cathode off-gas route 30*c*, the condensed water tank 10, and the mixed off-gas route 30*d* to be guided to the discharge route 32. With this, the controller 40 can also determine presence or absence of the combustible gas leak due to the damage of the electrolyte film based on the detection result from the combustible gas detector 12 provided in the discharge route 32.

The cooling water route 36 in which the cooling water used for the cooling in the fuel cell 1 during power generation circulates is disposed in the outside of a separator which is not illustrated in the fuel cell 1. That is, in the fuel cell 1, the anode of the fuel cell 1 and the cooling water route 36 are shut off from each other with a separator. At this point, even when the separator is damaged due to degradation over time or overpressure, for example, the damage is water-sealed by the cooling water circulating in the cooling water route 36. With this configuration, the fuel gas (combustible gas) supplied to the anode does not flow out to the side of the cooling water route 36 from the damaged part.

However, when larger overpressure is generated on the anode side, this water seal may be broken. When the water seal is broken, in the fuel cell system 102 according to the second example, the fuel gas (combustible gas) supplied to the anode enters into the cooling water route 36 from the fuel cell 1 to be guided to the cooling water tank 7. The combustible gas guided to the cooling water tank 7 is guided to the condensed water tank 10 via the communication route 18 provided between the cooling water tank 7 and the condensed water tank 10. Thereafter, the exhaust gas containing the combustible gas is guided to the discharge route 32 via the mixed off-gas route 30d to merge with the cooling air sent out from the air supplier 11 at the merging part 19. As described above, the exhaust gas containing the combustible gas having leaked into the cooling water route 36 from the fuel cell 1 due to the damage of the separator can be detected by the combustible gas detector 12 provided in the downstream side of the merging part 19 in the discharge route 32. With this, the controller 40 can determine presence or absence of leakage of the combustible gas due to the damage of the separator based on the detection result from the combustible gas detector 12.

Another factor described below also causes leakage of the combustible gas in the fuel cell system 102 according to the second example. That is, the case where the shut-off valve 24 provided in the impurity discharge route 30f is out of order, the leakage is caused. For example, when the shut-off valve 24 is left in the opened state due to the disorder, the combustible gas (hydrogen) contained in the anode off-gas circulating in the recycle route 30e is continuously released into the discharge route 32 via the impurity discharge route 30f and the mixed off-gas route 30d.

As described above, even when the gas is leaked due to the disorder of the shut-off valve 24, the anode off-gas released from the recycle route 30e is guided to the merging part 19 in the discharge route 32 via the impurity discharge route 30f and the mixed off-gas route 30d. The anode off-gas then merges with the cooling air supplied by the air supplier 11 at the merging part 19 to be the mixed gas and the mixed gas circulates in the discharge route 32. The combustible gas detector 12 provided in the downstream side of the merging part 19 in the discharge route 32 thus can detect the concentration of the combustible gas in the mixed gas. With this, the controller 40 can determine presence or absence of leakage of the combustible gas due to the disorder of the shut-off valve 24 based on the detection result from the combustible gas detector 12.

Furthermore, another factor described below also causes leakage of the combustible gas in the fuel cell system 102 according to the second example. For example, there are some cases where excessive pressure is generated in the recycle route 30e, whereby the water seal by the water stored in the condensed water communication route 25 and the condensed water tank 10 is broken. When the water seal is broken in this manner, the anode off-gas circulating in the recycle route 30e is continuously released into the condensed water tank 10 via the condensed water communication route 25. However, even in this case, the anode off-gas released into the condensed water tank 10 circulates in the mixed off-gas route 30d to be guided to the merging part 19 in the discharge route 32. The anode off-gas then merges with the cooling air supplied by the air supplier 11 at the merging part 19 to be the mixed gas before circulating in the discharge route 32. The combustible gas detector 12 provided in the downstream side of the merging part 19 in the discharge route 32 thus can detect the concentration of the combustible gas in the mixed gas. With this, the controller 40 can determine presence or absence of leakage of the combustible gas due to the breakage of the water seal by the condensed water based on the detection result from the combustible gas detector 12.

As described above, in any case of the above-described factors of leakage of the combustible gas, the exhaust gas containing the leaked combustible gas is collected at one merging part 19 without failure to merge with the air supplied by the air supplier 11, and then becomes the mixed gas to circulate in the discharge route 32. The combustible gas detector 12 provided in the downstream of the merging part 19 thus can detect the concentration of the combustible gas in the mixed gas. With this, regardless of the factor of leakage of the combustible gas, the controller 40 can determine presence or absence of leakage of the combustible gas based on the detection result from the combustible gas detector 12.

Many modifications or other embodiments of the present disclosure are obvious to the skilled person from the description above. Accordingly, the description above should be interpreted as mere exemplifications and provided for the purpose of teaching the best mode for implementing the present disclosure to the skilled person. The details of the structures and/or functions in the description may be substantially changed without departing from the scope of the present disclosure.

The present disclosure is effective in a fuel cell system that is housed in a housing and in which an exhaust gas has to be discharged to the outside, for example.

What is claimed is:

1. A fuel cell system comprising:
a reformer that generates a hydrogen containing gas from a fuel gas and includes a burner;
a fuel cell that uses the hydrogen containing gas and an oxidant gas to generate power;
an exhaust gas route for an exhaust gas discharged from the fuel cell to flow;
an air supplier that suctions air within the fuel cell system;
an air supply route for the air suctioned by the air supplier;
a merging part that is a part where the exhaust gas flowing in the exhaust gas route and the suctioned air flowing in the air supply route merge with each other;
a discharge route that discharges a mixed gas composed of the exhaust gas and the suctioned air having merged at the merging part to the atmosphere;
a gas-liquid separator disposed on the exhaust gas route between the fuel cell and the merging part; and
a combustible gas detector that is provided in the discharge route and detects concentration of a combustible gas contained in the mixed gas, wherein:
with respect to a flow of the suctioned air flowing in the air supply route and the discharge route, from an upstream side, the air supplier, the merging part, and the combustible gas detector are disposed in this order,
the exhaust gas includes an anode exhaust gas discharged from an anode of the fuel cell, and a cathode exhaust gas discharged from a cathode of the fuel cell,
the exhaust gas route includes an anode exhaust gas route for the anode exhaust gas and a cathode exhaust gas route for the cathode exhaust gas,
the burner is disposed on the anode exhaust gas route to combust the anode exhaust gas and exhaust a combustion gas,
a condenser is disposed on the cathode exhaust gas route,
the anode exhaust gas route downstream of the burner is connected to the cathode exhaust gas route at a position upstream of the condenser,
the cathode exhaust gas route bypasses the burner and is connected to the condenser,
the gas-liquid separator is a condensed water tank storing water obtained from the cathode exhaust gas and the combustion gas by the condenser, and
the condensed water tank is connected to the reformer by a condensed water route.

2. The fuel cell system according to claim 1, wherein the merging part is formed on a predetermined position in the discharge route.

3. The fuel cell system according to claim 1, wherein
the exhaust gas route includes
- a plurality of routes connecting the fuel cell and the gas-liquid separator, and
- a mixed off-gas route that collects the exhaust gas flowing in the plurality of routes and connects the gas-liquid separator and the merging part.

4. The fuel cell system according to claim 1, further comprising:
a controller including a processor and a memory storing a program, wherein
the program, when executed by the processor, causes the controller to perform:
- receiving the concentration of a combustible gas,
- determining occurrence of leakage of the combustible gas when the concentration of the combustible gas detected by the combustible gas detector exceeds a threshold, and
- controlling the fuel cell system to stop power generation upon determining that leakage of the combustible gas is occurred.

5. The fuel cell system according to claim 1, further comprising:
a housing that houses the fuel cell system, wherein
the air supplier is a ventilation blower that ventilates air in an inside of the housing.

6. The fuel cell system according to claim 1, further comprising:
a housing that houses the fuel cell system;
a cooling water route for cooling water for cooling the fuel cell to circulate during power generation; and
a radiator that is provided in the cooling water route and cools heated cooling water by cooling the fuel cell, wherein
the air supplier is a blower for radiation that suctions air in an inside of the housing and supplies cooling air to the radiator.

* * * * *